(12) United States Patent
Hardt et al.

(10) Patent No.: US 12,199,438 B2
(45) Date of Patent: Jan. 14, 2025

(54) METHOD FOR OPERATING AN ENERGY SUPPLY SYSTEM, SYSTEM CONTROLLER FOR AN ENERGY SUPPLY SYSTEM, AND ENERGY SUPPLY SYSTEM

(71) Applicant: SMA Solar Technology AG, Niestetal (DE)

(72) Inventors: Christian Hardt, Kassel (DE); Andreas Falk, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 18/337,543

(22) Filed: Jun. 20, 2023

(65) Prior Publication Data

US 2023/0335999 A1 Oct. 19, 2023

Related U.S. Application Data

(63) Continuation of application No. PCT/EP2021/086481, filed on Dec. 17, 2021.

(30) Foreign Application Priority Data

Dec. 22, 2020 (DE) ...................... 10 2020 134 772.3

(51) Int. Cl.
*H02J 3/38* (2006.01)
*H02J 3/18* (2006.01)

(52) U.S. Cl.
CPC ............... *H02J 3/381* (2013.01); *H02J 3/18* (2013.01); *H02J 2300/24* (2020.01)

(58) Field of Classification Search
CPC ...... H02J 3/38; H02J 3/381; H02J 3/18; H02J 2300/24
See application file for complete search history.

(56) References Cited

U.S. PATENT DOCUMENTS

| 2010/0277002 A1 | 11/2010 | Folts et al. |
| 2019/0020286 A1 | 1/2019 | Kovanen et al. |
| 2021/0013719 A1 | 1/2021 | Braun |

FOREIGN PATENT DOCUMENTS

| CN | 103986181 A | 8/2014 |
| CN | 104104103 A | 10/2014 |

(Continued)

OTHER PUBLICATIONS

International Search Report dated Apr. 5, 2022 for International Application No. PCT/EP2021/086481.

(Continued)

*Primary Examiner* — Robert L Deberadinis
(74) *Attorney, Agent, or Firm* — Eschweiler & Potashnik, LLC

(57) ABSTRACT

The disclosure describes a method for operating an energy supply installation which is connected to an AC supply grid via a transformer, and exchanges electrical power with the AC supply grid via the transformer. The transformer is connected on a first side to the AC supply grid and on a second side to an AC installation grid of the energy supply installation, wherein the energy supply installation has at least one inverter which exchanges electrical power between a DC unit on the DC side of the inverter and the AC installation grid on the AC side of the inverter. The method includes receiving at least one parameter of the power conversion of the at least one inverter by an installation controller, determining a setpoint AC voltage for the AC installation grid by the installation controller according to the parameter, transmitting the setpoint AC voltage to the transformer.

19 Claims, 3 Drawing Sheets

(56) References Cited

FOREIGN PATENT DOCUMENTS

| DE | 202015101806 U1 | 4/2015 |
|----|-----------------|--------|
| DE | 102018203889 A1 | 9/2019 |
| EP | 2504901 A2 | 10/2012 |
| EP | 3429051 A1 | 1/2019 |
| KR | 20110068199 A | 6/2011 |
| WO | 2011066081 A2 | 6/2011 |

OTHER PUBLICATIONS

Kabiri Roozebeh et al. "LV Grid Voltage Regulation Using Transformer Electronic Tap Changing, With PV Inverter Reactive Power Injection" IEEE Journal of Emerging and selected topics in power electronics. IEEE, Piscataway, NJ, USA, vol. 3, No. 4 Dec. 1, 2015 (Dec. 1, 2015), pp. 1182-1192, ISSN: 2168-6777, XP011588769.

METHOD FOR OPERATING AN ENERGY SUPPLY SYSTEM, SYSTEM CONTROLLER FOR AN ENERGY SUPPLY SYSTEM, AND ENERGY SUPPLY SYSTEM

REFERENCE TO RELATED APPLICATIONS

This Application is a Continuation of International Application number PCT/EP2021/086481, filed on Dec. 17, 2021, which claims the benefit of German Application number 10 2020 134 772.3, filed on Dec. 22, 2020. The contents of the above-referenced Patent Applications are hereby incorporated by reference in their entirety.

FIELD

The disclosure is directed to energy supply systems that exchange electrical power with a higher-level energy supply grid via a grid connection point. The disclosure is directed to a method for operating an energy supply system, to provide a system controller for an energy supply system, and also to provide an energy supply system, with which more efficient and/or more flexible operation is made possible.

BACKGROUND

Energy supply systems exchange electrical power with a higher-level energy supply grid via a grid connection point. In particular, systems with power-electronics current-converters—for example, photovoltaic (PV) systems, energy storage systems or even major consumers such as electrolyzers—are routinely connected up to the higher-level grid—for example, an AC supply grid—via a transformer. Such large-scale systems may have a system controller which, amongst other things, sets the apparent power consisting of active power and reactive power at the grid connection point.

In EP 2 504 901 a system controller of a PV system is described which ascertains an AC target voltage as a function of DC voltages of all the inverters of the PV system, and sets a transformation ratio of the transformer at the grid connection point as a function of the target voltage.

In EP 3 429 051 the efficiency of an inverter is influenced by a change of the transformation ratio of the transformer at the grid connection point.

In CN 104104103 and CN 103986181 it is described how to set the transformation ratio of a transformer as a function of an MPP voltage (maximum-power-point voltage) of a PV system.

The nominal power output of a current-converter of an energy supply system, in particular of an inverter, is limited, as a rule, by a maximum current intensity of the currents converted in the inverter, in particular by a maximum AC-side grid current. At a given (AC) current intensity, the nominal power output of the inverter can be increased by an increase in the (AC) voltage. Hence the nominal power output of the inverter rises linearly with rising AC voltage. Therefore for technical and economic reasons it is advantageous to be able to choose the AC nominal voltage to be as high as possible.

The higher the nominal AC voltage, the higher the minimum DC voltage at the DC terminal of the inverter also has to be, in order to be able to maintain controlled operation of the inverter. In particular, in the case of a known inverter with an inverter bridge circuit and with a voltage link circuit which is directly connected to a DC voltage-source or voltage sink, the minimum DC voltage is the voltage that is necessary in order to be able to exchange an AC current having desired apparent power with the AC supply grid in controlled manner at given AC voltage.

To the extent that the higher-level AC supply grid is regarded as rigid and the transformation ratio of the transformer between the inverter and the AC supply grid is regarded as fixed, the fixed point of the AC voltage in the energy supply system is often the voltage at the grid connection point—that is to say, the voltage at the winding of the transformer on the AC-supply-grid side.

The AC voltage on the AC side of the inverter, on the other hand, is influenced by diverse effects, so, depending upon the extent of the system and the corresponding number of installations between the grid connection point and the inverter, considerable changes may arise in the AC voltage in the energy supply system. In this connection, the AC voltage may depend dynamically on the apparent power of the inverter, in which case a reactive power in the overexcited range as required by the AC supply grid may noticeably raise the AC voltage at the inverter by reason of the inductive properties of the installations, in particular of the transformer itself.

The transformation ratio between the AC voltage on the side of the energy supply system of the transformer and the AC voltage in the AC supply grid can be set via a tap-changer switch of the transformer at the grid connection point. As a rule, such a tap-changer switch is operated by its own control unit in such a way that changes in the voltage of the AC supply grid are counteracted, in order to decouple the AC voltage within the energy supply system from such changes.

SUMMARY

In this disclosure, the abbreviation DC (direct current) stands for direct current or direct voltage, depending upon the context, and the abbreviation AC (alternating current) stands correspondingly for alternating current or alternating voltage.

The disclosure is directed to a method for operating an energy supply system, to provide a system controller for an energy supply system, and also to provide an energy supply system, with which more efficient and/or more flexible operation is made possible.

A method according to one embodiment of the disclosure serves to operate an energy supply system that is connected to an AC supply grid via a transformer and exchanges electrical power with the AC supply grid via the transformer. The transformer is connected to the AC supply grid on a first side and to an AC system grid of the energy supply system on a second side. The energy supply system has at least one inverter which exchanges electrical power between a DC unit on the DC side of the inverter and the AC system grid on the AC side of the inverter.

The method comprises
receiving at least one parameter of the power conversion of the at least one inverter, the at least one parameter, in one embodiment, being received by a system controller of the energy supply system,
establishing an AC set voltage for the AC system grid as a function of the at least one parameter of the power conversion of the at least one inverter, the AC set voltage, in one embodiment, being established by the system controller, and
communicating the AC set voltage to the transformer, wherein a tap-changer switch of the transformer is configured to set a transformation ratio in such a manner that the product of the voltage in the AC supply grid and the transformation ratio yields the AC set voltage.

The energy supply system may be, for example, a photovoltaic system (PV system) which has been designed principally to feed electrical power into the AC supply grid. Such a PV system may include a plurality of electrical components, for example, a plurality of photovoltaic (PV) modules, which are distributed in a decentralized manner over a large area. A group of PV modules that are grouped string wise—that is to say, one below the other in the form of a series connection—is also called a photovoltaic string (PV string). A PV generator may have one or more PV strings connected in parallel. A DC unit may, for example, have one or more such PV strings or one or more such PV generators and may be connected to an inverter. An extensive PV system with a total power output within the megawatt range may have a plurality of DC units and correspondingly extensive installations such as AC lines and, where appropriate, intermediate transformers.

A DC unit may also be, for instance, a DC storage unit which can be charged and discharged using, for example, DC current, so that the energy supply system can draw power from the AC supply grid or feed power into it, as needed. A DC unit may be, in addition, a DC load such as, for example, an electrolysis unit or similar, so the energy supply system may be designed principally to draw power from the AC supply grid.

The at least one inverter of the energy supply system sets on its DC side a DC voltage which may be geared toward the desired working point of the DC unit—that is to say, for example, toward the working point of maximum power (MPP) of a PV generator. If the respective PV generator is operated at the MPP with a relatively high DC voltage, it is desirable to feed in the PV power at an AC voltage that is as high as possible, in order to keep the output currents of the inverter and the currents in the system correspondingly as low as possible, and hence to minimize losses. However, if the MPP voltage drops, for instance in the case of low irradiation, for example, in the morning and/or in the evening, and/or at high temperatures, the situation may arise that the DC voltage no longer suffices to set a sufficiently high voltage at the AC terminal of the inverter.

In the case of a DC storage unit by way of DC unit, the DC voltage may depend on, amongst other things, the state of charge of the battery of the DC storage unit. In one embodiment, a fully charged battery may have a relatively high DC voltage so that the exchange of electrical power via the inverter can take place at a correspondingly high AC voltage. In the case of an electrolyzer, the power drawn by the electrolyzer can be set on the basis of the voltage, so the electrolyzer has a relatively high DC voltage, for example, at a high power, and can draw electrical power from a correspondingly high AC voltage via the inverter.

It is therefore advantageous in one embodiment to vary the AC voltage in the AC system grid as a function of the DC voltage, and to adjust the transformation ratio of the tap-changer switch accordingly.

In embodiments, the transformer has a control system for setting the tap-changer switch. The control system of the tap-changer switch can, in one embodiment, operate self-sufficiently, i.e. operating depending on the present voltage of the AC supply grid and on a (fixed) AC set voltage for the energy supply system. In addition, the control system of the tap-changer switch can be influenced by the system controller. The control system of the tap-changer switch can, in one embodiment, regulate the tap-changer switch largely autonomously in such a manner that a specified AC set voltage in the AC system grid is approximated. For this purpose, the tap-changer switch assumes differing positions with differing transformation ratios as a function of the AC supply-grid voltage. In addition, the control system of the tap-changer switch can receive inputs—for example, the AC set voltage—from outside. Advantageously, the AC set voltage can be variably specified by such an input and can be suitably adapted in the course of the operation of the energy supply system. The input—for example, the AC set voltage—is provided, for example, by the system controller which is communicatively connected to the transformer or to the control system thereof.

For executing the method, a system controller may be used which, in one embodiment, is communicatively connected to the at least one inverter.

The method enables the optimization of energy supply systems—for example, PV systems, storage systems or consumer systems, in particular large-scale systems within the megawatt range. In the case of systems with centralized inverters that themselves already have power outputs within the megawatt range and that are operated, for instance, with a large number of PV strings, batteries and/or consumers, the possible use cases for the centralized inverter(s) can be expanded.

By virtue of the method, it can be ensured that the AC voltage can be set as high as possible at given DC voltage and given reactive power output of the system. This is possible regardless of the direction of power flow—that is to say, the method can be used for energy supply systems that draw electrical power from the AC supply grid as well as for energy supply systems that feed electrical power into the AC supply grid.

In addition, by virtue of the method it can be ensured that the DC voltage on the DC side of the at least one inverter is sufficiently high in comparison with the AC voltage on the AC side of the at least one inverter in order to enable controlled operation of the inverter. In this connection, the AC voltage on the AC side of the inverter is, in one embodiment, lowered only when absolutely necessary—that is to say, when the inverter cannot generate from a given DC voltage a controlled AC voltage on its AC side that leads to a feed.in of sufficient AC power into the AC supply grid. This occurs, for example, at a relatively low MPP voltage and/or battery voltage, or when from a given AC voltage on the AC side of the inverter a controlled DC voltage cannot be generated that is needed for a feed into the DC unit, for example, into a storage unit with low state of charge or into an electrolyzer with low rated power.

In one embodiment, the at least one parameter is determined in the at least one inverter and comprises a vector length, the vector length comprising the ratio of the amplitudes of the voltages on the AC side and on the DC side of the at least one inverter.

In one embodiment, the vector length is proportional to the degree of modulation of a pulse-width-modulation control (PWM control) of the at least one inverter. Hence the vector length substantially represents the relationship between the DC voltage applied to the inverter and the amplitude of the AC voltage generated by the inverter on the AC side for the controlled transfer of power. Depending upon the control of the inverter being used in the concrete application, the vector length may be represented by various equivalent variants and, where appropriate, in scaled form.

In one embodiment, the amplitude of the AC voltage vector that is generated by the control of the inverter on the AC side of the inverter can be expressed in percent of the maximum modulation of the present DC voltage. At 100%, the vector length corresponds exactly to the full modulation of a sinusoidal signal within the given DC boundaries. By so-called overmodulation, the vector length can rise in operation to about 105%, without impermissible distortions and harmonic currents arising. For this purpose, in one embodiment, use may be made of special clock-pulse methods, for example, a space-vector modulation and/or a modulation of the position of the DC or AC center potential, or conventional modulation methods in combination with filter elements of the inverter may be designed in such a way that any distortions of the fed currents remain within the bounds permitted by standards, even in the case of vector lengths up to about 105%.

In one embodiment, the inverter is operated in grid-following mode, i.e. the inverter output voltage vector follows the AC voltage on the AC system grid and impresses the current on its AC side. In this embodiment, the inverter is operated similar to a current source rather than as a voltage source, and the energy supply system is operated, where appropriate, in grid-supporting manner but, not, or at least not predominantly, in grid-forming manner as used to be in an island grid.

In one embodiment, the AC set voltage is repeatedly determined as a function of the vector length, the vector length depending, for example, on the instantaneous voltage on the DC side of the at least one inverter.

In one embodiment, the vector length depends on the instantaneous apparent power exchanged with the AC supply grid, for example, on the instantaneous active power and/or reactive power of the inverters.

The method makes it possible to ensure that a vector length of 105% is not exceeded, even in the case of a rather low minimum DC voltage, for example, at the minimum MPP voltage of the PV system, at low state of charge of the battery of the storage system, or at low power of the electrolyzer. For this purpose, the transformation ratio of the transformer can be chosen dynamically and flexibly in such a way in one embodiment that the AC voltage on the AC system grid can be increased to such an extent that the vector length of 105% is not exceeded when a minimum DC voltage is applied and when reactive power is demanded in overexcited operation.

Via the tap-changer switch, the voltage at the system-side winding of the transformer can be set to the AC set voltage, so this AC set voltage can be adjusted by changing the transformation ratio by means of the tap-changer switch whenever the AC supply-grid voltage is changing. Advantageously, in one embodiment the AC set voltage is further adapted to the present DC voltage, so that any control reserves with respect to the vector length are exhausted. In this connection, it is made possible to adapt the transformation ratio of the transformer not only to a changing AC supply-grid voltage but also to a changing system-side AC voltage, for instance to an AC voltage in the system that has been raised by feeding reactive power from the inverters to the transformer. This flexible adaptation, both to a changing DC voltage and to a changing system-side AC voltage, makes the operation of the system more flexible, more robust and/or more efficient.

In one embodiment the method makes it possible that, on the one hand, an AC voltage in the energy supply system can be chosen that is as high as possible and, on the other hand, the maximum vector length for distortion-free controlled exchange of power is not exceeded.

In embodiments, the energy supply system has more than one inverter, the inverters exchanging electrical power between, respectively, a DC unit on the DC side of the inverter and the AC system grid on the AC side of the inverter, the at least one parameter comprising respective vector lengths of the inverters, the respective vector length comprising the respective ratio of the amplitudes of the voltages on the AC side and on the DC side of the respective inverter.

In one embodiment of the method, the at least one parameter comprises a vector length derived from the respective vector lengths of the inverters, which comprises, in particular, a vector length averaged from the respective vector lengths of the inverters.

For this purpose, the system controller can capture, for example, the vector lengths of the modulation of the respective inverters. This can be done, for example, by the inverters communicating their respective present vector lengths (or equivalent quantities) to the system controller. From the vector lengths, measured in percent, of several or all of the inverters, which are connected to a common system grid with a common transformer with tap-changer switch, a mean value, for instance, can then be created. In one embodiment of the method, the averaged vector length comprises an arithmetic mean of the respective vector lengths of the inverters.

In one embodiment of the method, the derived vector length is determined from the respective low-pass-filtered vector lengths of the respective inverters. For example, the vector lengths and/or the mean created therefrom—for example, the arithmetic mean—can additionally be low-pass-filtered with a time constant, in order to obtain a moving average of the vector lengths of all the inverters. The time constant is, in one embodiment, large in relation to the time-base of control of the inverter, for example, longer than one minute with a time-base of the inverter control of about 10 microseconds at e.g. 100 kHz switching frequency of the inverter control. The derived vector length may therefore depend on a moving average of the respective vector lengths.

In one embodiment, a scatter of the individual vector lengths about the mean value—for example, the scatter around the moving average—can be determined. This is particularly advantageous, in one embodiment, in order to determine a maximum value of the present vector lengths. It may happen that this scatter is large, for example, in the case of differently-sized or differently-operated DC units in the energy supply system with a plurality of inverters. It may also happen that the scatter within a system is relatively slight, for example, if the inverters that are connected to the common transformer are of homogeneous construction—that is to say, have comparable DC units that are exposed to comparable environmental conditions and are otherwise operated in largely symmetrical manner. This may apply both to PV systems and to storage systems and also to major consumers such as electrolyzers.

In one embodiment of the method, the AC set voltage is lowered, in order to reduce the vector lengths, if the derived vector length of the inverters lies above a first specifiable limiting value, the first limiting value being between 95% and 105%, between 98% and 102%, or, for example, 99%. If the derived vector length continues to rise, the AC set voltage is reduced further until a vector length of about the first limiting value is attained again—that is to say, for example 99% or less. In the case of an energy supply system with one inverter, the vector length of the one inverter can be used instead of the derived vector length.

Since the vector length may, in principle, also be above 99% during the operation of the inverter but is limited to at most 105%, the range between 99% and 105% constitutes a control reserve power range. This reserve should be so large, because the control for the tap-changer switch is comparatively slow, and other boundary conditions may change quickly between the control interventions. For example, the set value of reactive power for the energy supply system might suddenly be adapted by the operator of the grid, which may lead to a change in the AC voltage within the energy supply system and hence to a change in the vector length at given DC voltage in the course of generation of the corresponding reactive power by the inverters.

In the case of a derived vector length—or a vector length for a single inverter—between 97% and 99%, a change in the AC set voltage, for example, does not need to happen. In one embodiment, however, a change in the AC set voltage may occur if the individual vector lengths have a large scatter—that is to say, in particular, if the maximum value of the present vector lengths lies above the first limiting value plus a tolerance band, the tolerance band lying within the aforementioned control reserve.

Should the vector length of the inverters be unavailable, or at least not directly available for communication to the system controller, an rms voltage can, in one embodiment, alternatively be captured directly on the AC side of the inverter—before or after any AC smoothing choke—and set in proportion to the DC voltage on the DC side of the inverter. The following relationships can be ascertained from such a capture of the voltage:

vector length in percent=100 times the rms conductor voltage directly at the inverter bridge output times $\sqrt{2}/U\_DC$;

vector length in percent=100 times rms terminal voltage at the AC outputs of the inverter times k times $\sqrt{2}/U\_DC$;

U_DC here is the DC voltage, and k here is a correction factor which depends on the current through the sine-filter choke. For the purpose of calculating k, the current, the phase angle between current and voltage, the inductance of the sine-filter choke and the capacitance of the sine-filter capacitor can be drawn upon.

In one embodiment of the method, the AC set voltage is raised if the vector length V and/or the derived vector length attains a second specifiable limiting value, the second limiting value being between 90% and 100%, preferably between 96% and 98%. The second limiting value preferably lies below the first limiting value.

In one embodiment, once the AC set voltage has been lowered in order to attain a derived vector length—or a vector length for a single inverter—of less than the first limiting value, for example 99%, the AC set voltage is increased again only when the derived vector length falls below a second limiting value. The second limiting value may be, for example, between 90% and 100%, between 96% and 98%; for example, or it may be about 97%. The shorter the derived vector length becomes, the further the AC set voltage is raised by the method, in order to attain a derived vector length greater than the second limiting value. Corresponding remarks apply to the vector length in the case of energy supply systems with one inverter. As soon as the AC set voltage has attained a preset maximum voltage, and/or the highest step of the tap-changer switch has been attained, no further increase occurs.

In one embodiment of the method, the separation between first and second limiting values depends on the step-width of the tap-changer switch and is, for example, proportional to the relative change in voltage resulting from at least three switching steps of the tap-changer switch. This is a possible definition of a tolerance range within which the vector length may vary without switching actions of the tap-changer switch occurring.

The separation between the first and second threshold values corresponds to a hysteresis width. The hysteresis width may, in one embodiment, be so large that it encompasses the change in voltage resulting from at least three switching steps; in the case of a typical "separation" between the switching steps of, for example, 0.65% of the nominal voltage, the hysteresis width might accordingly amount to, for example, at least 2%, relative to the vector length. As a result, a tolerance range arises, within which the vector length may vary without switching actions of the tap-changer switch occurring.

In one embodiment of the method, the maximum number of changes in the AC set voltage per unit of time is specifiable and is, for example, between 30 and 70 times per day, or between 40 and 60 times per day.

In one embodiment the method is adjusted in such a way that, on daily average, the AC set voltage is changed, thereby triggering a switching operation in the tap-changer switch, not more than a specifiable number of times, for example 50 times. For this purpose, an adaptive method can be chosen that counts the switching actions per day. If more than the specifiable number of changes, for example more than 50 changes, in the AC set voltage foreseeably become necessary during a day or so, the time constant of the moving averaging of the vector length can, for example, be raised. Additionally, the time constant can be limited, for example to no more than 20 minutes. If fewer than the specifiable certain number of changes in the AC set voltage are counted on one day, the time constant of the moving averaging can be reduced accordingly. Such an adaptive method can, for example, start with a time constant within the medium range—that is to say, within the range of about half of the limitation, for example 10 min.

Another possibility to reduce the number of cycles is, for example, by increasing the hysteresis width. In the example described above, the hysteresis amounts to 2%. But the width can also be increased, for example, to 3% or more, if more than the specifiable certain number of changes in the AC set voltage per day are registered.

The rate of change of the AC set voltage can be limited to a slope that depends on the nominal voltage of the energy supply system. For example, the rate of change of the AC set voltage can be limited to at most Un per unit of time, where Un is the nominal voltage of the system, and a sensible unit of time is, for example, one hour. Times between two switching actions on the tap-changer switch of less than one minute should preferably be avoided at all.

Another possibility to reduce the number of cycles—that is to say, reducing the number of changes in the AC set voltage, and hence the number of the switching operations on the tap-changer switch—is, for example, to limit the rate of change of the AC set voltage more strictly, for example, by increasing the time constant in the above example to, for example, two hours or a half a day.

In one embodiment of the method, the specified AC set voltage lies above a specifiable minimum value and/or below a specifiable maximum value, the minimum value and/or the maximum value depending on a nominal voltage for the AC system grid.

In one embodiment the AC set voltage does not fall below a settable minimum value. The AC set voltage does not exceed a settable maximum value. The minimum and maximum values typically lie within a tolerance band for the system-internal grid voltage. In one example:

maximum grid voltage of the system=110%→maximum AC set voltage=107%; and minimum grid voltage of the system=90%→minimum AC set voltage=92%.

These percentage values relate to the system-internal nominal voltage. An asymmetry of the tolerance band and/or of the minimum and maximum values relative to the nominal voltage of the system is possible.

A further method according to the disclosure serves to operate a transformer in an energy supply system that is connected to an AC supply grid via the transformer. Via the transformer, electrical power is exchanged between the energy supply system and the AC supply grid, the transformer being connected to the AC supply grid on a first side and to an AC system grid of the energy supply system on a second side. The energy supply system has at least one inverter which exchanges electrical power between a DC unit on the DC side of the inverter and the AC system grid on the AC side of the inverter. The energy supply system has, in addition, a system controller, and the transformer has a control unit.

The method comprises receiving, by means of the control unit of the transformer, an AC set voltage for the AC system grid from the system controller of the energy supply system, adapting the transformation ratio of the transformer by means of a tap-changer switch so that the product of the voltage in the AC supply grid and the transformation ratio yields the AC set voltage, the AC set voltage having been determined by using at least one parameter of the power conversion of the at least one inverter.

If the energy supply system is, for instance, a PV system, in that the DC units comprise PV generators, the positions of the tap-changer switch may, for example, follow a typical daily course of the MPP voltage of the PV generators. For instance, the PV system starts in the morning with a low DC voltage and with an AC voltage that is correspondingly as low as possible, in order to enable the earliest possible start. The MPP voltage, and hence the DC voltage at the inverter, rises soon after sunrise, so the AC voltage can be increased, in order to minimize losses. At high temperatures—for example, around midday—the MPP voltage may drop once again, in which case the AC voltage can be lowered, where appropriate, in order then to rise again later and attain a low value, analogous to sunrise, at sunset.

If the energy supply system is, for example, an energy storage system, in that the DC units comprise batteries, the positions of the tap-changer switch may, for example, follow a state of charge of the batteries. For example, in the case of a low state of charge and correspondingly low DC voltage, charging or discharging can be effected with an AC voltage that is also as low as possible, in order to exploit the voltage range of the battery as widely as possible. In the case of a rising state of charge, the DC voltage also rises, so the AC voltage can be increased, in order to minimize losses.

If the energy supply system is, for example, mainly a major consumer, in that the DC units comprise electrolyzers, for example, the positions of the tap-changer switch may, for example, follow a power setpoint of the electrolyzer, which can be set on the basis of the DC voltage. For example, the inverter can supply the electrolyzer at a low rated power setpoint and at correspondingly low DC voltage from an AC voltage that is as low as possible, in order to exploit the power range of the electrolyzer as widely as possible. A high power setpoint of the electrolyzer requires a correspondingly high DC voltage, which the inverter can also generate from a high AC voltage, so the AC voltage can be increased, for example, in order to minimize losses.

In addition to the properties of the DC unit, the operation of the inverter itself may influence the AC voltage in the energy supply system. In one embodiment, a reactive power generated by the inverter may lead to a change in the AC voltage by reason of inductive properties of the installations of the energy supply system. The method according to the disclosure can take these influences into account, in that the parameter of the power conversion depends on the AC voltage at the output of the inverter. Thus, operation with voltage-increasing reactive power in the overexcited range is enabled by reducing the AC voltage based on providing a suitably lowered AC set voltage.

In one embodiment, the tap-changer switch of the transformer sets the transformation ratio on the basis of the AC set voltage and the AC voltage in the AC supply grid. In this connection, the transformation ratio changes at given AC set voltage if the voltage in the AC supply grid changes. At given voltage in the AC supply grid, the transformation ratio changes by virtue of a change in the AC set voltage. In this respect, the communication of the AC set voltage to the transformer is suitable to change the transformation ratio via the tap-changer switch of the transformer, and in this way to adapt the AC voltage in the energy supply system optimally. The transformer is, for example, a high-voltage transformer, for example, a 120 MVA transformer.

Installed in the transformer of the energy supply system, which is arranged between an inverter of the energy supply system and a higher-level AC supply grid, is the tap-changer switch which is able to change the transformation ratio of the transformer in, for example, 31 steps. Hence the system-side voltage can be changed at given AC voltage in the supply grid within a change-range of, for example, +/−10% (0.65% per step). Larger change-ranges of up to +/−20% may also be found. The center of the change-range may correspond to a nominal voltage, so that changes are possible symmetrically by the same amount in both directions, or may deviate from a nominal voltage, so that the change-range is asymmetrical about the nominal voltage (for example, +15%, −5%).

In one embodiment, the transformer and/or its tap-changer switch or the control unit thereof can be triggered communicatively, for example, via a fieldbus, and can be supplied with the AC set voltage in this way.

The control of the transformer for the tap-changer switch can be utilized to make the use of centralized inverters with high power within the megawatt range particularly efficient at high AC voltages which, where appropriate, are influenced by feeding of reactive power by the inverter itself, and at the same time, at least temporarily, at low DC voltages.

In one embodiment of the method, the at least one parameter comprises a vector length, so that a change in the voltage on the DC side and/or a change in the fed apparent power of the at least one inverter causes a change in the transformation ratio of the transformer.

In one embodiment of the method, a change in the reactive power of the at least one inverter causes a change in the transformation ratio of the transformer. This is, in one embodiment, achieved by a change in the AC set voltage in response to a change in the reactive power of the inverter or the change in the vector length following therefrom.

In one embodiment, the vector length amounts, by definition, to exactly 100% if the phasor voltage of the inverter—that is to say, the magnitude of the rotating phase vector of the AC voltage on the AC side of the inverter-corresponds exactly to the set DC voltage, for example, in case that no reactive power is being generated by the inverter.

An advantage in the case where the vector length is used as a parameter or component of the parameter is that a capturing of all possible individual influencing variables is not necessary. The vector length is a value that can be used advantageously, since, as a rule, it is readily available and already inherently includes most, if not all, of the relevant influencing variables for the optimal control of the tap-changer switch.

In one embodiment, the tap-changer switch can also be accessed directly as an alternative to, or in addition to, the communication of the AC set voltage to the control unit of the tap-changer switch, so that instead of the AC set voltage the transformation ratio itself, for instance, can be used as control variable. The system controller might then also take over the control of the tap-changer switch as an alternative to, or in addition to, the control of the inverters. In one embodiment, the system controller can then also react to any changes in the grid voltage in the higher-level AC supply grid, and the grid voltage in the AC supply grid can be made available to the system controller, for example, by a measurement of the AC current at the grid connection point. As an alternative to, or in addition to, the control of the transformer, the system controller can then also realize safety functions, certain switching sequences, delays, etc. Hence the system controller can also take over, at least partially, functions of a largely self-sufficient control unit of the transformer.

An energy supply system is connected to an AC supply grid via a transformer, the transformer being connected to the AC supply grid on a first side and to an AC system grid of the energy supply system on a second side. The energy supply system has at least one inverter which is connected to a DC unit on a DC side and to the AC system grid on an AC side. A system controller for such an energy supply system is configured:
  to receive at least one operating parameter of the at least one inverter,
  to determine an AC set voltage for the AC system grid on the basis of the operating parameter, and
  to communicate the determined AC set voltage to the transformer in order to set a transformation ratio of the transformer by means of a tap-changer switch in such a manner that the product of the voltage in the AC supply grid and the transformation ratio yields the AC set voltage.

The AC set voltage for the AC system grid is, in one embodiment, determined in such a manner that the AC voltage on the AC system grid is as high as possible throughout the operation of the system.

In one embodiment, an energy supply system has a transformer, an AC system grid, at least one inverter and at least one DC unit, the energy supply system having a system controller which has been configured to carry out the above method.

BRIEF DESCRIPTION OF THE DRAWINGS

Embodiments of the application will be elucidated in more detail in the following with the aid of figures.

DETAILED DESCRIPTION

Figure 1:
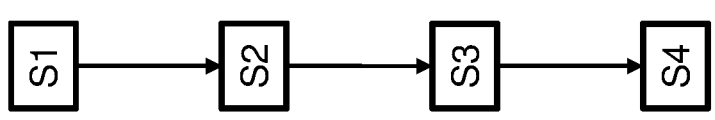
FIG. 1 shows schematically an embodiment of a method for operating an energy supply system.

An embodiment of a method for operating an energy supply system (10, see FIG. 2) is represented in FIG. 1. The energy supply system 10 has a transformer 14, with a tap-changer switch 16, an AC system grid 18 and two inverters 22, 24. The energy supply system 10 further has a system controller 20 which is communicatively connected, for example, via a fieldbus 30, to the inverters 22, 24 and to the transformer 14 or, to be more exact, to the tap-changer switch 16 of the transformer 14 (or to a control system of the tap-changer switch 16, which is not represented in the figures). The energy supply system 10 is connected to an AC supply grid 12 via the transformer 14.

At S1, the system controller 20 of the energy supply system 10 receives a vector length V of the respective inverter 22, 24. At S2, the system controller 20 determines an AC set voltage for the AC system grid 18 as a function of a vector length derived from the vector lengths V. At S3, the system controller 20 communicates the AC set voltage to the transformer 14, the tap-changer switch 16 of the transformer 14 having been configured to set a transformation ratio T in such a manner that the product of the voltage in the AC supply grid 12 and the transformation ratio T yields the AC set voltage. At S4, the tap-changer switch 16 sets the transformation ratio T accordingly.

In the course of the method, the system controller 20 communicates an AC set voltage to the tap-changer switch 16 at S3. The actual actuating signals—that is to say, the actual setting or changing of the transformation ratio of the transformer 14—are undertaken by the tap-changer switch 16 or by a control system of the transformer 14, which triggers the tap-changer switch 16.

Figure 2:
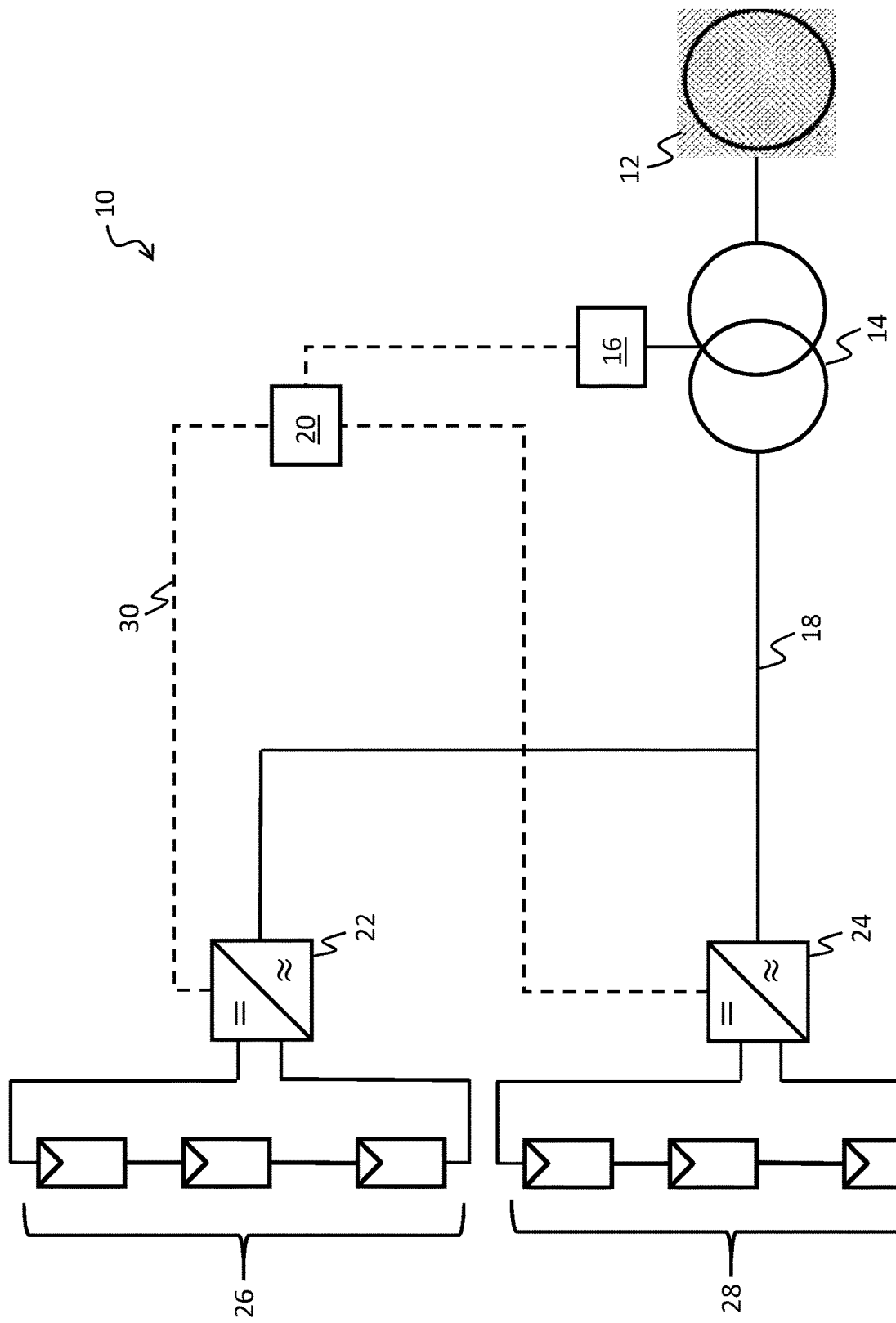
FIG. 2 shows an energy supply system schematically.

FIG. 2 shows an embodiment of the energy supply system 10 with the system controller 20, which is communicatively connected to the inverters 22, 24 via a hard-wired or wireless communication structure, for example, via the fieldbus 30.

Via the transformer 14, the energy supply system 10 exchanges electrical power with the AC supply grid 12, the transformer 14 being connected to the AC supply grid 12 on a first side and to the AC system grid 18 of the energy supply system 10 on a second side. The transformation ratio of the transformer 14 can be set via the tap-changer switch 16. The transformer 14 further has a control system via which the tap-changer switch 16 can be triggered. The energy supply system 10 has two inverters 22, 24 which exchange electrical power between, respectively, a PV string 26, 28 on the DC side of the inverter 22, 24 and the AC system grid 18 on the AC side of the inverter 22, 24.

The PV strings 26, 28 that are represented in FIG. 2 are examples of DC units in an energy supply system 10 and may readily be replaced by storage units, for example, batteries, or by loads, for example electrolyzers. No significant changes are required for such alternative embodiments, neither to the inverters 22, 24 nor to the method described above.

The control system of the transformer 14 is configured to receive the AC set voltage for the AC system grid 18 from the system controller 20 of the energy supply system 10. The control system of the transformer 14 is further configured to adapt the transformation ratio of the transformer 14 using the tap-changer switch 16 in such a way that the product of the voltage in the AC supply grid 12 and the transformation ratio yields the AC set voltage.

If the specified AC set voltage is changed distinctly and/or if the voltage in the AC supply grid 12 changes significantly, it is ensured within the tap-changer switch 16 that several acts are switched briefly in succession, in order to attain the act at which the voltage applied to the transformer 14 on the system side corresponds to the AC set voltage. In this regard, the system-side voltage at the transformer 14 does not have to be measured or ascertained explicitly; rather, the tap-changer switch 16 can be set in such a way that the product of the (measured) voltage in the AC supply grid 12 and the transformation ratio T yields the AC set voltage. As a result, changes in the voltage in the AC supply grid 12 are compensated; at the same time, however, the fact is disregarded that this product may be, as a rule, unequal to the system-side voltage at the transformer 14 and, moreover, unequal to the voltages at remote points within the energy supply system 10. Such deviations arise, for example, by reason of resistive and inductive effects in the case of high active powers and reactive powers in the energy supply system 10, and are taken into account in the method by the transformation ratio T being set by means of the AC set voltage, the AC set voltage being determined by the system controller 20 by using the vector length derived from the respective vector lengths V of the inverters 22, 24.

If, for example, the derived vector length lies outside a desired range, in particular if it attains an upper limiting value, new set values for the tap-changer switch 16 are generated. In case these set values cannot be implemented by the tap-changer switch 16, or can only be implemented with a delay, for example, by reason of overheating or a defect in the tap-changer switch 16, an appropriate feedback signal is generated by the tap-changer switch 16 and communicated to the system controller 20. The system controller 20 can then, where appropriate, adapt the set values of active power and reactive power for the inverter(s) 22, 24, in order to change the vector length V in another way, for example, to reduce it and to limit it to a maximum vector length of, for example, 99%.

The inverter 22, 24 has a bridge circuit in which AC-side alternating current—or AC-side alternating voltage—is converted into DC-side direct current—or DC-side direct voltage—or conversely, for example, by pulsed actuation of semiconductor switches. The inverter 22, 24 provides a "chopped" DC voltage on the AC side of the bridge circuit, which is applied to an inductor, for instance to a choke of an output filter of the inverter 22, 24, whereas the AC voltage of the AC system grid is applied on the other side—that is to say, "behind" the choke. A standard-compliant sinusoidal AC current arises which follows the AC voltage if the instantaneous mean value of the chopped DC voltage is higher at any time than the instantaneous AC voltage behind the choke. Hence the inverter 22, 24 sets an AC voltage as pulse-width-modulated DC voltage on the AC side of its bridge circuit. In order that this works in a controlled manner, for example, with inverters with DC-side voltage link circuits and conventional bridge circuits, so that a settable active power is exchanged between the DC unit 26, 28 and the AC system grid 18, the DC-side DC voltage should be at least as high as the crest value of the AC grid voltage of the AC system grid 18. This corresponds to a vector length V of 100% at most. For the purpose of generating reactive power, under certain circumstances the DC voltage even has to be higher still in relation to the crest value of the AC voltage on the AC system grid 18, by reason of the phase offset between current and voltage. By suitable design of the choke and/or by means of special modulation methods, an inverter 22, 24, for example, in three-phase grids, can also be operated in controlled manner with vector lengths V greater than 100%. The working range with vector lengths V greater than 100% is used here as a so-called control reserve.

The present vector length V during the operation of an inverter 22, 24 is influenced, in particular, by:
  the instantaneous DC voltage on its DC side, which is variable,
  the instantaneous apparent power in the energy supply system 10, split into active power and reactive power, both of which are variable, and
  the number of inverters 22, 24 on the same transformer 14, and the impedances between the inverter 22, 24 and the point of connection to the AC supply grid 12; these factors are, as a rule, system-specific and to this extent are largely constant, provided that all the inverters 22, 24 are regularly in operation.

The reactive power influences the vector length V both directly at the respective inverter 22, 24 (higher reactive power=higher current=longer phase vector=greater vector length V) and indirectly through its influence on the voltages along the installations in the energy supply system 10. The resulting inductive decoupling impedance between the terminals of the bridge circuit of the inverter 22, 24 and the grid connection point is comprised of an AC choke in the inverter 22, 24, the inductor of the transformer 14 with the tap-changer switch 16, the inductors of the extended AC lines of the AC system grid 18, as well as, for example, further interconnected transformers. In one embodiment, in over-excited operation, the reactive power brings about a raising of the voltage and, for example, by reason of the inductance of the transformer 14, a raising of the system-side AC voltage at the transformer 14.

Figure 3:
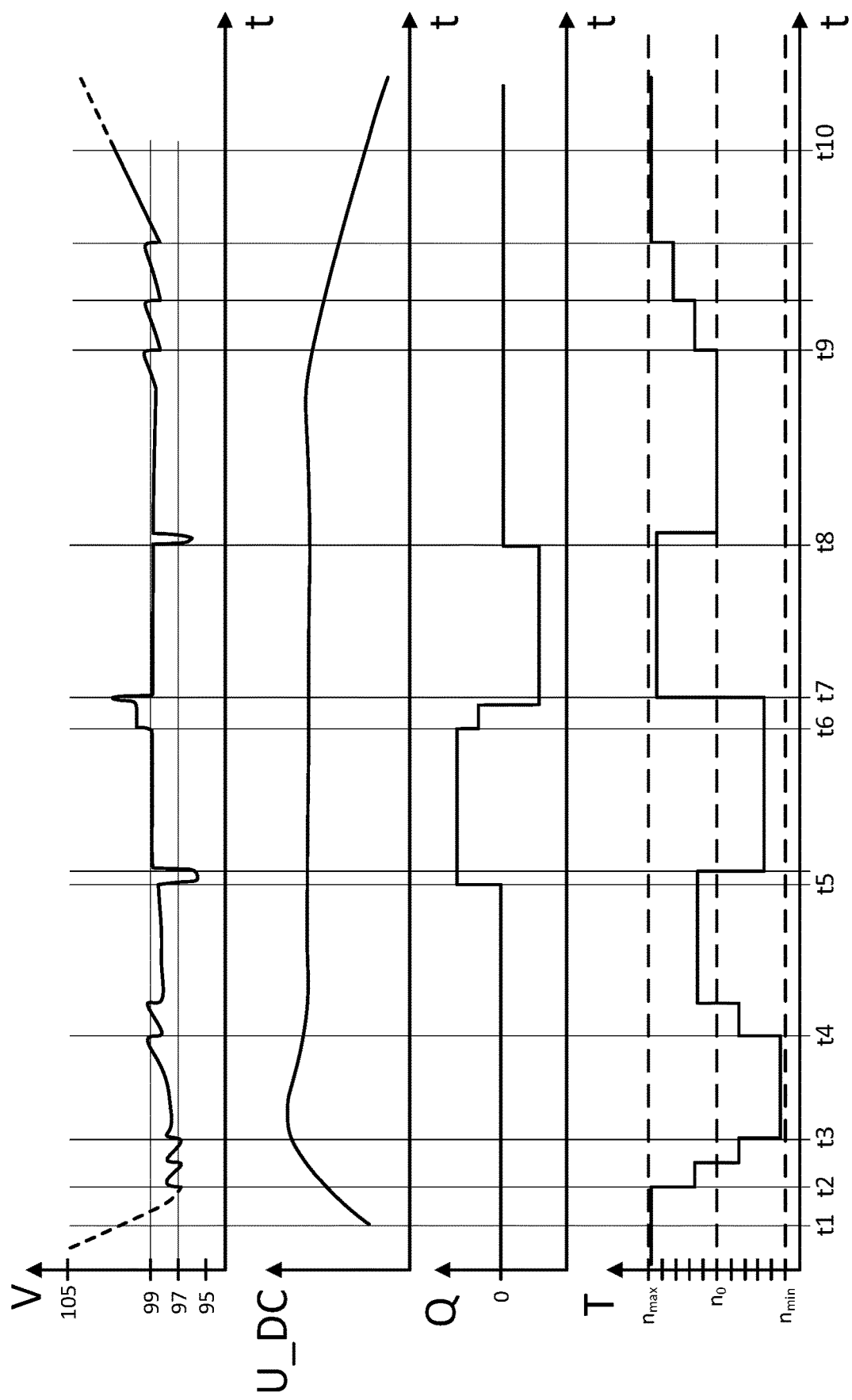
FIG. 3 shows, in one example, temporal progressions of various quantities in an energy supply system.

In FIG. 3, time courses of a vector length V, a DC voltage U_DC on the DC side of an inverter 22, 24, a reactive power Q generated by the inverter, and the transformation ratio T of the transformer 14 are represented.

The vector length V may represent the vector length of one of the inverters 22, 24, or the vector length derived from the vector lengths of the inverters 22, 24, provided that the inverters 22, 24 are operated in largely equivalent manner. The DC voltage U_DC may represent the DC voltage of one of the DC units 26, 28 or a mean value of the DC voltages of the DC units 26, 28, provided that the DC units 26, 28 are constructed largely homogeneously. The reactive power Q may represent a default value which is set at the grid connection point of the energy generation system. The transformation ratio T is reciprocally proportional to the resulting AC set voltage, in that a low AC set voltage at given and constant voltage in the AC supply grid 12 requires a high transformation ratio T, and conversely.

At time t1, the voltage U_DC is too low, so neither of the inverters 22, 24 is yet in operation. The vector length V has therefore been represented in dashed form, since it can only be estimated from the DC and AC voltages but is not yet in fact present as a parameter, for lack of ongoing controlled operation. The transformation ratio T is set to the maximally possible value $n_{max}$. As a result, the AC voltage in the system grid 18 is as low as possible, in order to enable a start-up of the inverters 22, 24 at a DC voltage U_DC that is as low as possible.

At time t2, the DC voltage has attained a value that suffices for operating the inverters 22, 24. By reason of the high transformation ratio $T=n_{max}$, the vector length at t2 falls below the lower limiting value of 97%. Thereupon the system controller 20 can raise the AC set voltage, so the tap-changer switch 16 reduces the transformation ratio T of the transformer 14. By reason of the further rising DC voltage U_DC, this process is repeated twice more until time t3.

Between t3 and t4, a relatively low transformation ratio T has been set—that is to say, the AC voltage in the system grid 18 is relatively high. The DC voltage U_DC exhibits slight fluctuations which, however, are so slight that the vector length V varies between the lower limiting value of 97% and the upper limiting value of 99%.

At time t4, the DC voltage U_DC has fallen so far that the vector length V exceeds the upper limiting value of 99%. Thereupon the system controller 20 lowers the AC set voltage, so the tap-changer switch 16 raises the transformation ratio T of the transformer 14. This is repeated once again shortly after t4 by reason of the somewhat further falling DC voltage U_DC.

At time t5, the reactive power Q changes abruptly. This may have been triggered, for instance, by reason of the implementation of an requirement for reactive power by an operator of the grid, or by a reaction of the energy generation system 10 to a grid fault in the AC supply grid 12. In the example according to FIG. 3, the generation of the reactive power by the inverters 22, 24 leads to a lowering of the AC voltage in the system grid 18, whereupon the vector length V also drops and falls below the lower limiting value of 97%. Consequently the AC set voltage can be increased, and the transformation ratio T can be lowered correspondingly; in FIG. 3 this happens with a certain time-delay, by which it can be ensured that the number of switching actions is limited, for instance by a transient condition of the control being awaited, in order to avoid unnecessary switching actions by reason of temporary effects. The time-delay until the change of the transformation ratio T is, in addition, not critical, since a short vector length causes merely insignificant losses. After the change of the transformation ratio T, the vector length V is initially constant at just under 99%.

At time t6, the reactive power Q changes in the opposite direction, leading in this example to an increase in the AC voltage in the system grid 18. Correspondingly, the vector length V also rises and initially attains a value above the upper limiting value of 99%. To a certain extent and for a certain time, this is not critical, in that the inverters 22, 24 are also capable, in principle, of being operated within a certain control reserve with vector lengths up to about 105%. At time t7, however, the vector length V rises distinctly once again by reason of a renewed change in the reactive power Q, so the system controller 20 reacts immediately and lowers the AC set voltage distinctly, so the transformation ratio T is increased correspondingly, in order to keep the vector length V below the upper limiting value of 99%.

At time t8, the reactive power is set to zero, so the AC voltage in the system grid drops again and the vector length falls correspondingly below the lower limiting value of 97%. Thereupon, where appropriate, the transformation ratio T is also reduced with a certain time-delay, in order to increase the AC voltage within the permitted bounds and thereby, for example, to decrease losses.

At time t9, the DC voltage U_DC drops continuously and attains such a low value at time t10 that the inverters 22, 24 can no longer be operated and switch off (the opposite action as compared to the switching on at time t2). By virtue of the falling of the DC voltage between t9 and t10, the vector length V rises continuously and is reset several times below the upper limiting value of 99% by the transformation ratio T being increased, until the maximum transformation ratio $n_{max}$ has been attained and the further rise of the vector length can no longer be counteracted.

The time courses represented in FIG. 3 are to be understood as being an example and not true to scale. In principle, such or similar progressions may arise in energy supply systems that comprise DC units in the form of PV generators, energy storage units and/or consumers. In particular, FIG. 3 may illustrate a typical daily routine of a PV system in which the MPP voltage—and hence the DC voltage—exhibits a steep ascent at sunrise and a—somewhat less—steep drop at sunset and is largely constant in between but may still vary, for example, by reason of varying temperature or irradiation.

In concrete terms, the temporal sequences within period t1 to t3 may illustrate, for instance, the behavior of a PV system at sunrise or the charging and starting of an electrolyzer. The behavior within period t3 to t5 may arise, for example, in a PV system that is exposed to fluctuating temperatures or irradiation, for instance. Within period t5 to t8, the behavior is mainly influenced by external influences, for example, by reactive-power defaults, and to this extent may arise in energy supply systems with all types of DC units. The time courses within period t9 to t10 are particularly typical of PV systems at sunset or of energy storage systems operated with high discharging power.

By virtue of the method, in one embodiment it is ensured that the AC voltage is kept as high as possible and is lowered only when absolutely necessary—that is to say, for example, when the inverter cannot generate from a given DC voltage a controlled AC voltage that brings about a power flowing from the DC unit (PV, storage unit and similar) into the AC grid, or, conversely, if from a given AC voltage a controlled DC voltage cannot be generated that brings about a power flowing into the DC load (storage unit, electrolyzer and similar).

The invention claimed is:

1. A method for operating an energy supply system that is connected to an AC supply grid via a transformer and that exchanges electrical power with the AC supply grid via the transformer, the transformer being connected to the AC supply grid on a first side and to an AC system grid of the energy supply system on a second side, the energy supply system having at least one inverter which exchanges electrical power between a DC unit on a DC side of the inverter and the AC system grid on an AC side of the inverter, comprising:
   receiving, via a system controller, at least one parameter of a power conversion of the at least one inverter,
   establishing, using the system controller, an AC set voltage for the AC system grid as a function of the at least one parameter,
   communicating the AC set voltage to the transformer, wherein a tap-changer switch of the transformer is configured to set a transformation ratio in such a manner that a product of a voltage in the AC supply grid and the transformation ratio yields the AC set voltage.

2. The method as claimed in claim 1, wherein the at least one parameter is determined in the at least one inverter and comprises a vector length, the vector length comprising a ratio of amplitudes of voltages on the AC side and on the DC side of the at least one inverter.

3. The method as claimed in claim 2, wherein the vector length is proportional to a degree of modulation of a PWM control of the at least one inverter.

4. The method as claimed in claim 2, wherein the AC set voltage is established as a function of the vector length, the vector length depending on an instantaneous voltage on the DC side of the at least one inverter.

5. The method as claimed in claim 4, wherein the vector length depends on an instantaneous apparent power, comprising an active power or a reactive power, or both, of the at least one inverter, exchanged with the AC supply grid.

6. The method as claimed in claim 2, wherein the energy supply system comprises more than one inverter, the more than one inverter exchanging electrical power between, respectively, the DC unit on the DC side of the inverter and the AC system grid on the AC side of the inverter, wherein the at least one parameter comprises respective vector lengths, the respective vector length comprising the respective ratio of amplitudes of voltages on the AC side and on the DC side of the respective inverter.

7. The method as claimed in claim 6, wherein the at least one parameter comprises a vector length derived from the respective vector lengths, which comprises a vector length averaged from the respective vector lengths.

8. The method as claimed in claim 7, wherein the derived vector length is determined from respective low-pass-filtered vector lengths of the respective inverters.

9. The method as claimed in claim 7, wherein the averaged vector length comprises an arithmetic mean of the respective vector lengths of the respective inverters.

10. The method as claimed in claim 7, wherein the AC set voltage is lowered if the vector length and/or the derived vector length attains a first limiting value, the first limiting value being between 95% and 105%.

11. The method as claimed in claim 10, wherein the AC set voltage is raised if the vector length and/or the derived vector length attains a second limiting value, the second limiting value being between 90% and 100%.

12. The method as claimed in claim 11, wherein the second limiting value lies below the first limiting value.

13. The method as claimed in claim 11, wherein a difference between the first and second limiting values depends on a step-width of the tap-changer switch and is proportional to a relative change in voltage caused by at least three consecutive switching steps of the tap-changer switch.

14. The method as claimed in claim 1, wherein a maximum number of changes in the AC set voltage per unit of time is specified and is between 30 and 70 times per day.

15. The method as claimed in claim 1, wherein a specified AC set voltage lies above a specified minimum value and/or lies below a specified maximum value, the specified minimum value and/or the specified maximum value depending on a nominal voltage for the AC system grid.

16. A method for operating a transformer in an energy supply system that is connected to an AC supply grid via the transformer, wherein electrical power is exchanged between the energy supply system and the AC supply grid via the transformer, wherein the transformer is connected to the AC supply grid on a first side and to an AC system grid of the energy supply system on a second side, wherein the energy supply system has at least one inverter which exchanges electrical power between a DC unit on a DC side of the inverter and the AC system grid on an AC side of the inverter, wherein the energy supply system has a system controller, and the transformer has a control unit, comprising:
receiving, via the control unit of the transformer, an AC set voltage for the AC system grid from the system controller of the energy supply system,
adapting a transformation ratio of the transformer using a tap-changer switch so that an product of the voltage in the AC supply grid and the transformation ratio yields the AC set voltage,
wherein the AC set voltage is determined by using at least one parameter of a power conversion of the at least one inverter.

17. The method as claimed in claim 16, wherein the at least one parameter comprises a vector length, so that a change in a voltage on the DC side of the at least one inverter brings about a change in the transformation ratio of the transformer.

18. The method as claimed in claim 16, wherein a change in reactive power of the at least one inverter brings about a change in the transformation ratio of the transformer.

19. An energy supply system with a transformer, with an AC system grid, with at least one inverter, and with at least one DC unit, the energy supply system including a system controller which is configured to carry out a method as claimed in claim 1.

* * * * *